United States Patent
Uhrenholt

(10) Patent No.: US 11,361,485 B2
(45) Date of Patent: Jun. 14, 2022

(54) GRAPHICS PROCESSING

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/658,926

(22) Filed: Oct. 21, 2019

(65) Prior Publication Data

US 2020/0151926 A1 May 14, 2020

(30) Foreign Application Priority Data

Oct. 23, 2018 (GB) ..................................... 1817228

(51) Int. Cl.
*G06T 11/40* (2006.01)
*G06T 1/20* (2006.01)
*G06T 15/80* (2011.01)

(52) U.S. Cl.
CPC ................ *G06T 11/40* (2013.01); *G06T 1/20* (2013.01)

(58) Field of Classification Search
CPC ............ G06T 11/40; G06T 1/20; G06T 15/80
See application file for complete search history.

(56) References Cited

U.S. PATENT DOCUMENTS

| | | | | |
|---|---|---|---|---|
| 7,852,345 B1 * | 12/2010 | Brown | ..................... | G06T 15/04 345/541 |
| 2002/0174318 A1 | 11/2002 | Stuttard | | |
| 2007/0146378 A1 * | 6/2007 | Sorgard | .................. | G06T 11/20 345/581 |
| 2008/0150950 A1 * | 6/2008 | Sorgard | ................ | G06T 15/005 345/522 |
| 2008/0162592 A1 * | 7/2008 | Huang | ................ | G06F 11/3476 |
| 2008/0262997 A1 * | 10/2008 | Furusho | ................ | G06F 16/902 |
| 2014/0118364 A1 | 5/2014 | Hakura | | |
| 2017/0193691 A1 * | 7/2017 | Langtind | ................ | G09G 5/363 |

FOREIGN PATENT DOCUMENTS

| | | |
|---|---|---|
| GB | 2433014 | 6/2007 |
| GB | 2457525 | 8/2009 |
| GB | 2488196 | 8/2012 |
| GB | 2517809 | 3/2015 |

OTHER PUBLICATIONS

GB Combined Search and Examination Report dated Apr. 17, 2019, GB Patent Application No. GB1817228.8.

* cited by examiner

*Primary Examiner* — Yi Yang
(74) *Attorney, Agent, or Firm* — Vierra Magen Marcus LLP

(57) ABSTRACT

When generating a set of tile-lists for use in a tile-based graphics processing system when rendering a scene for display, vertex data is obtained for a plurality of draw calls, and the obtained vertex data is then processed to generate for each of the draw calls data indicative of which tile(s) the primitives associated with that draw call should be rendered for when rendering the scene for display. The vertex data for at least some of the plurality of draw calls can be obtained and processed out of order and/or in parallel and the data is then sorted based on a desired rendering order for the draw calls in order to generating a tile-list identifying the sequence of draw calls to be rendered. In embodiments, the generated data is sorted using a re-ordering buffer.

21 Claims, 5 Drawing Sheets

GRAPHICS PROCESSING

BACKGROUND

The technology described herein relates to graphics processing systems, and in particular to a method and apparatus for use when processing graphics primitives in a tile-based graphics processing systems.

Graphics processing is normally carried out by first splitting the scene to be displayed into a number of similar basic components or "primitives", which primitives are then subjected to the desired graphics processing operations. The graphics "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

Thus, once primitives and their vertices have been generated and defined, the primitives can be processed by the graphics processing system, in order, e.g., to display the frame. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

Many graphics processing systems use so-called "tile-based" rendering. In tile-based rendering, the two-dimensional render output (i.e. the output of the rendering process, such as an output frame to be displayed) is rendered as a plurality of smaller area sub-regions, usually referred to as "tiles". The tiles are each rendered separately (typically one-after-another), and the rendered tiles are then recombined to provide the complete render output (e.g. frame for display). In such arrangements, the render output is typically divided (by area) into regularly-sized and shaped rendering tiles (they are usually e.g., squares or rectangles).

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area sub-regions.)

The advantage of such tile-based rendering is that primitives that do not appear in a given tile do not have to be processed for that tile, and therefore can be ignored when the tile is processed. This can allow the overall amount of graphics processing necessary for a given render output to be reduced.

In a tile-based rendering system, it is accordingly usually desirable to be able to identify and know those primitives that are actually present in a given tile (sub-region), so as to, e.g., avoid unnecessarily rendering primitives that are not actually present in a tile. In order to facilitate this, it is known to prepare for each tile a list of the primitives to be rendered for that tile (e.g. that will appear in the tile). Such a "tile-list" (which is also often referred to as a "primitive list") identifies, e.g. by reference to a primitive indicator, the primitives to be rendered for the tile in question.

The process of preparing tile-lists for each tile to be rendered basically therefore involves determining the primitives that should be rendered for a given tile. This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile, as will frequently be the case, it is included in the tile-list for each tile that it falls within.)

In effect, each tile can be considered to have a bin (the tile-list) into which any primitive that is found to fall within (i.e. intersect) the sub-region is placed (and, indeed, the process of sorting the primitives on a tile-by-tile basis in this manner is commonly referred to as "binning").

The tile-lists are usually prepared by processing the data for the primitives in a pipelined fashion, e.g. by performing a series of processing steps such as obtaining the vertex data for the primitives (i.e., primitive assembly, which may include various known geometry processing steps), bounding, binning, etc. These processes generally form part of a "tiler pipeline" within the overall graphics processing system. The tiler pipeline thus prepares the tile-lists, and then writes the tile-lists out (e.g. back to memory), so that the tile-lists can then be used to identify the primitives to be rendered for each tile when generating the desired render output, e.g. to display the frame.

However, the Applicants have recognised that there can be various processing inefficiencies within the tiler pipeline when preparing such tile-lists. Accordingly, the Applicants believe that there remains scope for improvements to existing tile-based rendering systems.

BRIEF DESCRIPTION OF THE DRAWINGS

A number of embodiments of the technology described herein will be described by way of example only and with reference to the accompanying drawings, in which.

DETAILED DESCRIPTION

Figure 1:
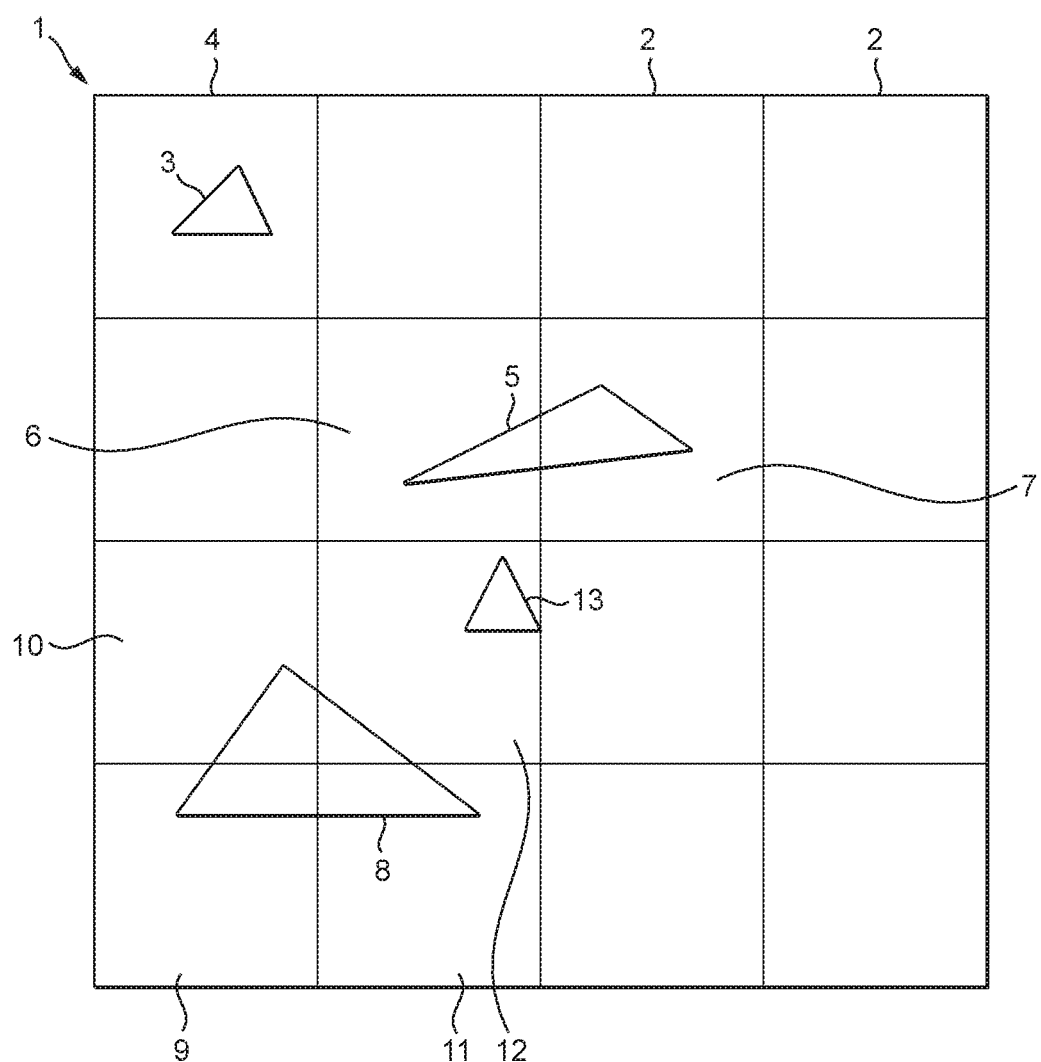
FIG. 1 shows schematically a tile-based graphics-processing arrangement.

A first embodiment of the technology described herein comprises a method for determining a set of data for use in a tile-based graphics processing system when rendering a scene for display, the set of data indicating which primitives are to be rendered for each of the tiles in the scene to be rendered, the method comprising:

obtaining vertex data for a plurality of draw calls, wherein the draw calls are desired to be rendered in a certain order, and wherein each draw call is associated with a set of one or more primitives; and processing each of the plurality of draw calls using the obtained vertex data to generate for each of the draw calls data indicative of which tile(s) the primitives associated with that draw call should be rendered for when rendering the scene for display, wherein the vertex data for at least some of the plurality of draw calls is obtained and processed out of order and/or in parallel;

the method further comprising:

sorting the data generated for the plurality of draw calls based on the desired rendering order and generating for each tile a tile-list identifying which draw calls should be rendered, and in which order, for that tile; and writing out the tile-lists for each of the tiles.

The technology described herein also extends to systems and apparatuses for graphics processing, e.g., and particularly to a tiler pipeline for a tile-based graphics processing system. The tiler pipeline may, e.g., be provided within a geometry processing unit of the overall graphics processing system.

A second embodiment of the technology described herein comprises a tiler pipeline for determining a set of data for use in a tile-based graphics processing system when rendering a scene for display, the set of data indicating which primitives are to be rendered for each of the tiles in the scene to be rendered, the tiler pipeline comprising:

a first stage including a vertex data fetching circuit for obtaining vertex data for a set of draw calls to be processed, each draw call being associated with a set of one or more primitives;

a second stage including a primitive processing circuit for processing the plurality of draw calls using the respective vertex data obtained from the first stage to generate for each draw call data indicative of which tile(s) the primitives associated with that draw call should be rendered for when rendering the scene for display; and a third stage including a write-out circuit for writing out a set of tile-lists indicating which draw calls should be rendered, and in which order, for each of the tiles;

wherein the tiler pipeline is operable to handle a plurality of draw calls, wherein the plurality of draw calls are desired to be rendered in a certain order, and wherein, when handling a plurality of such draw calls, the first and second stages are configured to obtain and process the vertex data for at least some of the plurality of draw calls out of order and/or in parallel, wherein the tiler pipeline further comprises a tile-list generating circuit configured to sort the data generated for the plurality of draw calls based on the desired rendering order and to generate for each tile a tile-list identifying which draw calls should be rendered, and in which order, for that tile.

Thus, the technology described herein relates generally to tiling operations, e.g. that may be performed within a geometry processing unit of a graphics processing system using a tile-based rendering scheme, i.e. wherein a two-dimensional render output (i.e. the output of the rendering process, such as an output frame to be displayed) is rendered as a plurality of smaller area sub-regions, i.e. "tiles". In particular, the technology described herein relates to methods for building so-called "tile-lists" for use when rendering a scene for display in such tile-based graphics processing systems, wherein a "tile-list" indicates which draw calls (i.e. primitives) fall within a given tile, and which draw calls (primitives) therefore need to be rendered for that tile when generating the render output. A "tile-list" thus identifies, e.g. by reference to a suitable primitive (or draw call) indicator, the sets of primitives (draw calls) to be rendered for the tile in question.

The process of preparing this data for inclusion into the tile-list(s) basically involves processing (each of) the primitives to determine which of the primitives should be rendered for a given tile (sub-region). This process is in an embodiment carried out by determining (e.g., at a desired level of accuracy) the primitives that intersect (i.e. that will appear (at least in part) within) the tile in question, and then preparing a list of those primitives and/or a set of data (commands) identifying those primitives.

In other words, each primitive falling within a given tile can be placed into a respective "bin" (i.e. tile-list) associated with that tile. This is repeated for each primitive (and for each tile) to determine which primitives should be included within the bins (tile-lists) for each of the tiles. This binning process thus effectively generates a list identifying all the primitives to be rendered for each of the tiles. These lists can then be written out, e.g. to memory, as the tile-lists.

Where a primitive falls into more than one tile, it is included in the list (bin) for each tile that it falls within. These tile-lists may be prepared for each tile individually (so that there is a one-to-one correspondence between the tiles and tile-lists). However, in some cases, or for at least some of the tiles, a tile-list may cover a set of plural tiles.

For processing reasons, at least some of the primitives are grouped into so-called "draw calls". A "draw call" thus essentially represents a single work task (job), e.g., relating to a set of one or more primitives that share common state or other data (e.g. shader data). Each draw call is thus associated with a set of one or more primitives and a draw call essentially causes the primitives within the draw call, which may e.g. represent one or more graphics objects, to be drawn out.

As used herein, a "draw call" is associated with a set of one or more primitives. That is, as used herein, a draw call may be associated with (only) a single primitive. (So, in some embodiments, the technology described herein processes individual primitives, and any references herein to processing draw calls, or draw call ordering, may in such cases refer to processing primitives.)

However, in an embodiment, at least some of (and in an embodiment the majority of, or even all of) the draw calls are associated with more than one primitive. For instance, because the primitives within a draw call can use shared (state) data, the primitives within a single draw call can be processed in one go using that shared (state) data. This saves the need to reset the shared data when processing the primitives within a given draw call, thereby improving the performance.

The technology described herein processes these draw calls, or sets of primitives, and determines a set of data (i.e. a set of tile-lists) indicating which draw calls (primitives) are to be rendered for which of the tiles within a given scene to be rendered. This information can then be used, e.g., when rendering, in a tile-by-tile fashion, the scene for display.

Thus, according to the technology described herein a set of data can be prepared for each tile including a list identifying any draw calls (i.e. sets of one or more primitives sharing some common state or other data) that are found to fall within (i.e. intersect) that tile, and that therefore would need to be rendered when rendering that tile. This process basically involves obtaining vertex data for the primitive(s) of a draw call and then processing the draw call in question, using its respective vertex data, by sorting the primitive(s) associated with the draw call on a tile-by-tile basis ("binning") in the normal way, as described above. This process is repeated for each and every draw call for the scene to be rendered. The data that is generated for each of the draw calls is thus placed into one or more "bins" (i.e. tile-lists), with each bin being associated with a particular tile or tiles. In this way, the tile-lists for each of the tiles can be prepared, with each tile-list identifying the draw calls (primitives) to be rendered for that tile. For instance, the binned data can be used to generate a set of commands for inclusion into the tile-lists, the commands causing the draw calls (primitives) for the respective tiles to be drawn out in the desired rendering order.

Once the tile-lists have been prepared, and written out, the system is able to then read the tile-lists to identify which draw calls should be rendered for each tile (sub-region). This information can then be used by the graphics processing system, e.g. when rendering the scene for display. For example, the graphics processing system will typically comprise a suitable tile-list reading circuit/circuitry that is able to extract this information from the tile-lists and inform the renderer as to which draw calls should be drawn out for each of the tiles.

It will be appreciated that in order to generate the desired render output, the draw calls will typically need to be rendered (for each tile) in a certain order. That is, there is a desired rendering order for the plurality of draw calls (which may, e.g. be defined by the graphics application programming interface (API)). When generating the tile-lists, as described above, the data identifying the draw calls should therefore be included into the tile-lists (bins) according to the desired draw call ordering, e.g. so that the tile-list reader is able to then read the tile-list and cause the primitives for that tile to be rendered in the desired order.

Thus, when preparing the tile-lists, the data (commands) identifying the primitives (and draw calls) should ultimately be included into a tile-list (for a respective tile) in sequence, i.e. according to the desired draw call rendering order. This requirement therefore places certain ordering restrictions on the processing of the primitives within the tiler pipeline.

One way to achieve the desired ordering of the draw calls would be to enforce full ordering throughout the entire tiler pipeline, with strict serialisation of both the processing of the primitives within each of the draw calls and of the processing of the plurality of draw calls, e.g. so that the first primitive of a given draw call is not allowed to start processing until the last primitive of the previous draw call has entered the tiler pipeline. That is, the ordering of the primitives (and draw calls) may be preserved within each stage of the tiler pipeline.

This may help to simplify the design of the tiler pipeline. However, this approach may also introduce some inefficient utilisation of resources, and can lead to processing 'bottlenecks' within the tiler pipeline. For instance, in this case, when the sampling positions (indices/vertices) for the primitives are loaded into the tiler pipeline from a cache (e.g. in memory), any 'misses' in the cache would stall the processing, due to the strict serialisation, even if data was available in the cache for other primitives which could therefore potentially be processed.

In some cases this may be acceptable since the overall graphics processing throughput for many applications is more often limited by the fragment processing (rendering) operations, rather than the geometry processing (tiling) operations.

However, it will be appreciated that the vertex data fetching is on the critical performance path for the tiler pipeline. Accordingly, in applications where there are a relatively larger number of primitives to be processed (so that the graphics processor performance may become limited by the tiler throughput), this stalling can lead to bottlenecks in the tiler pipeline that have a significant impact on the overall graphics processing throughput.

In order to hide some of this latency, a prefetching mechanism may be employed (and in an embodiment is also employed according to embodiments of the technology described herein) to start prefetching the raw geometry data (i.e. the vertices) into local storage accessible by the tiler pipeline for primitives that are some distance ahead of the primitive that is currently being processed in the tiler pipeline. The raw geometry data can then be processed to obtain the transformed vertex data that is used by the later stages of the tiler pipeline (e.g. for building the tile-lists) well in advance of it being needed (i.e. before the vertex data is issued to the next stage of the tiler pipeline).

However, when the draw calls are processed in a strictly serial manner, there can still be significant latency, especially at the start of a draw call. For example, when processing the raw geometry data for a draw call to obtain the (transformed) vertex data, the vertex shader may issue a number of position shading requests, e.g. to a shader core. Especially at the start of a draw call these shading requests may miss in multiple descriptor/instruction caches such that there is a long period (of multiple cycles) where the vertex data fetcher is unable to make forward progress, and the tiler operation therefore stalls pending the processing of that draw call.

As part of the technology described herein, the Applicants have now recognised that the ordering requirements on the draw calls within the tiler pipeline can in fact be relaxed, without negatively impacting on the overall processing, so long as the desired draw call ordering is enforced at some point before the tile-lists are ultimately prepared and written out, e.g. at the final stage of the tiler pipeline.

That is, the technology described herein recognises at which stages in the tiler pipeline the ordering must be enforced, and at which points the ordering can be relaxed. The technology described herein thus allows some of the ordering constraints within the tiler pipeline to be relaxed, e.g. rather than attempting to enforce strict serialisation of the draw calls throughout the entire tiler pipeline, and hence may allow for a more efficient use of the available processing resource and therefore an improved tiling throughput.

In particular, the technology described herein may enforce ordering on the processing of the draw calls (only) at the end of the tiler pipeline, whilst allowing other portions of the tiler pipeline to execute at least some of the draw calls out of sequence to increase performance, e.g. speed and/or throughput.

For instance, it can be seen that the tiler pipeline can be split conceptually into three basic stages: a (first) stage for fetching the vertex data; a (second) stage for processing the primitives using the vertex data in order to prepare the data that is to be included into the tile-lists; and a (third) write-out stage for writing out the tile-lists, e.g. back to memory.

The raw geometry data (i.e. the vertices) is normally stored in system memory, e.g. in the L2 cache. Accordingly, the raw geometry data must typically first be fetched into the tiler pipeline. The raw geometry data is in an embodiment then processed, e.g. by a suitable vertex shading circuit/circuitry in the first stage, in order to obtain the required (transformed) vertex data (e.g. position, colour, texture and other attributes). The first stage may thus comprise a vertex shader that receives the raw geometry data as input and then processes this, e.g. using one or more shader cores, in order to obtain (determine) the desired vertex data for each of the primitives. Once the vertex data has been obtained, this data is then fetched (by a vertex fetching circuit/circuitry) and issued to the next (second) stage of the tiler pipeline for further processing.

The primitives within an (each) individual draw call (at least where the draw call contains more than one primitive) should be, and in the technology described herein still are, processed in serial order, and this ordering is in an embodiment enforced in the first stage. That is, the first stage is in an embodiment configured so that the primitives within the individual draw calls are processed (to obtain the vertex data) in sequence.

For example, the vertex shader that is used to obtain the vertex data may be configured to implement a suitable policy, such as first-in-first-out, per draw call, so that the vertex data for a primitive within a given draw call is not fetched (or issued to the next stage) until after the vertex data for the previous primitive within that draw call has been fetched. In this way, the desired ordering of the primitives within a single draw call can be guaranteed in the first stage.

However, so long as the desired ordering between the different draw calls is enforced prior to writing the tile-lists out (back) to memory, according to the technology described herein the individual draw calls can be processed in the first stage out of order, e.g. in an interleaved and/or parallel fashion.

That is, the first stage only needs to enforce ordering for the processing of primitives within the individual draw calls, whereas separate draw calls can essentially be processed in, and issued from, the first stage in any order (e.g. out of order and/or in parallel), so long as the ordering is ultimately enforced at some stage within the tiler pipeline. According to the technology described herein, the ordering dependency between separate draw calls can thus be broken.

This means that the vertex fetching circuit/circuitry of the first stage can now work contemporaneously across multiple draw calls, so that if the vertex data for one of the draw calls is not (yet) available, but data is available for another draw call that is further back in the draw call order, the data for that draw call can thus be fetched and issued to the next (second) stage of the tiler pipeline for processing.

In this way, the performance of the tiler pipeline can be improved by reducing the instances of stalling, and avoiding the potential bottlenecks described above, which may otherwise occur when fetching the vertex data, e.g. in a strictly serial manner.

For instance, the first stage may comprise a set of plural vertex shading units arranged in a parallel fashion, each vertex shading unit being capable of processing a draw call to obtain the desired vertex data (with each vertex shading unit implementing, e.g., a first-in-first-out policy to enforce the ordering of primitives within each respective draw call, as described above). The first stage in an embodiment processes multiple draw calls in parallel using the plural vertex shading units. The vertex fetcher can thus fetch vertex data for draw calls from any of the vertex shading units as and when the vertex data for a draw call becomes available, and without having to wait on the vertex data for any of the other draw calls to become available.

So, according to the technology described herein, the first stage has an ordering requirement for the processing of primitives within individual draw calls. However, there is now no need to enforce ordering in the first stage between different draw calls, and at least some of the draw calls are in an embodiment processed in the first stage (and issued to the next (second) stage) out of order and/or in parallel.

The vertex data that is obtained for a (each) draw call is thus passed from the first stage to the next (second) stage of the tiler pipeline for processing, e.g. in order to determine for which tile(s) the draw call in question should be rendered for and for generating the data needed to prepare the tile-lists. The second stage in an embodiment processes the primitives using the obtained vertex data in the normal way, e.g. by determining which of the primitives intersect which of the tiles and binning the data for those primitives accordingly. Accordingly, the second stage generally includes a primitive processing circuit/circuitry that is operable to perform operations on the primitives using the vertex data including bounding box generation, binning, hierarchical iteration, etc., in order to prepare the data for inclusion into the tile-lists.

It will be appreciated that the second stage in an embodiment acts purely on local data, and so is able to handle draw calls (and primitives) in any order, i.e. in whichever order the primitives are issued from the first stage. Thus, there are no particular ordering requirements on the primitive processing operations performed by the second stage and the second stage can act on the vertex data in whatever order it is provided by the first stage.

The data that is generated by the primitive processing in the second stage is then used to prepare and write out the tile-lists for (each of) the tiles in the scene to be rendered. As explained above, the tile-lists indicate which primitives (and draw calls) should be rendered for the respective tile(s). For example, the tile-lists may, and in an embodiment do, comprise a list of commands for causing the draw calls to be rendered, as desired.

For the rendering pipeline to be able to generate the desired render output, the tile-lists should also indicate, for each tile that is to be rendered, the order in which the draw calls should be rendered for that tile. That is, for example, the tile-lists may contain an ordered list of data (commands) identifying each of the draw calls to be rendered in sequence.

This means that the draw call ordering does ultimately need to be enforced before the tile-lists are written out. However, it will be appreciated that according to the technology described herein at least some of the draw calls may be, and in an embodiment are, processed out of sequence in the first and second stages of the tiler pipeline.

Thus, the technology described herein further provides an ordering (or 're-ordering') mechanism that is able to sort the data that has been generated from the (potentially out of order) processing of the draw calls according to the desired rendering order, so that the desired data (commands) for each of the draw calls can then be included into the tile-lists in the desired sequence.

Accordingly, when handling a plurality of draw calls that are each associated with a set of one or more primitives and that are desired to be rendered in a certain order, the technology described herein is able to process at least some of the draw calls out of order, e.g. as and when the vertex data for those draw calls becomes available.

The desired ordering of the draw calls is then (re)enforced at the end of the tiler pipeline, when the tile-lists are ultimately being built, prior to them being written out, so that the data for the draw calls can be written into the tile-lists in the desired order.

Various techniques for sorting the data and preparing the tile-lists are contemplated. However, the technology described herein contemplates two main approaches for doing this.

In the first main approach, the data is (conceptually) re-ordered before it is placed into a tile-list. For example, a suitable "re-order" buffer may be included in the tiler pipeline between the primitive processing of the second stage and the write-out circuit/circuitry in the third stage. This re-order buffer is thus able to effectively sort the data generated by the second stage according to the desired draw call ordering, so that this data can then be included into the tile-lists in the correct sequence.

So, according to the first main approach, the draw calls can be processed in the first and second stages in any order, and written into the re-order buffer accordingly, but the data (commands) is then extracted from the re-order buffer, and included into the tile-lists, strictly according to the desired draw call ordering. The first stage is therefore able to obtain vertex data for multiple draw calls out of order, e.g. in parallel, and the vertex data can then be issued to the second stage, and processed thereby, out of order (e.g. in an interleaved fashion). The re-order buffer then ensures that the desired draw call ordering is enforced when the tile-lists are written out.

The re-order buffer thus provides a mechanism for enforcing the desired draw call ordering for the tile-lists thus enabling the possibility of the draw calls to be processed out of order in the preceding stages of the tiler pipeline whilst still allowing the desired tile-lists to be prepared and used in the normal way (e.g. so that the tile-lists are still readable in the normal way without having to modify the tile-list reading circuit/circuitry).

For example, after the tile-by-tile binning of the draw calls has been performed in the second stage, the data (or commands) indicative of which draw calls are to be written out for each of the tiles can be written into the re-order buffer, and then effectively (conceptually) re-ordered based on the desired draw call ordering so that the data (commands) can then be extracted from the re-order buffer in the desired order for inclusion into the tile-lists. So, for each tile, an ordered set of data (commands) indicating which draw calls should be drawn out for that tile can be extracted from the re-order buffer and then written into the tile-list for that tile.

Thus, in embodiments, the step of sorting the data generated for the plurality of draw calls based on the desired rendering order and generating for each tile a tile-list identifying which draw calls should be rendered, and in which order, for each tile comprises: passing the data generated for each of the draw calls into a buffer, and writing out the data for the tile-list for a tile from the buffer in sequence according to the desired rendering order.

In this way, a "chunk" of data (i.e. a tile-list) can be extracted from the re-order buffer for each tile, with the chunk of data including data (or commands) identifying which draw calls should be drawn out for that tile, and in which order. This data can then be included into, or written out as, a tile-list in the desired order. So, in an embodiment, a tile-list is generated from the data in the re-order buffer for a (and each) tile including the sequence of commands for that tile in the desired draw call order. In an embodiment the data for each of the draw calls associated with a given tile is written out contiguously in the desired sequence into a shared data file (memory location).

In this case, the tile-list comprises a continuous list identifying all of the draw calls for that tile, and the tile-list reader can simply work through the list to identify which draw calls should be rendered. If the tile-list overflows its data file a pointer can be included in the list that points to another data file (memory location), and the tile-list can then be continued in the same way in that data file (memory location). Thus, in the first main approach, the draw calls for a given tile are in an embodiment all written out in a continuous fashion to one or more shared data file(s) (memory location(s)). Thus, for each tile a pointer can be generated to the (first) data file (memory location) for that tile, and the list of commands in that data file can then be worked through in sequence to identify all of the draw calls associated with that tile.

In an embodiment, according to the first main approach, the (raw) vertices for a plurality of draw calls are prefetched into the first stage of the tiler pipeline, and processed thereby to obtain the desired vertex data (e.g. position, colour, texture and other attributes). The vertex data is thus in an embodiment obtained in parallel for a plurality of draw calls (although with the ordering of the primitives within each draw call in an embodiment being enforced, e.g. using a suitable first-in-first-out policy per draw call, as described above). The first stage thus in an embodiment acts on a set of parallel draw call streams.

When the vertex data for any one of the draw calls becomes available, the vertex data is in an embodiment then passed from the respective one of the parallel draw calls streams to a shared vertex fetcher, and then onto the next (second) stage of the tiler pipeline for further processing. Thus, in an embodiment, the vertex fetching and primitive processing still operate in a serial pipelined fashion. However, a draw call can now be issued to the vertex fetcher as soon as the vertex data for that draw call is available, and so the draw calls may be processed (and at least some of the draw calls in an embodiment are processed) out of order in the tiler pipeline. So, in an embodiment, the data from the processing of the draw calls is written into the re-order buffer in a serial fashion (but now potentially out of order). The re-order buffer enforces the desired draw call ordering when preparing the final tile-lists.

However, other arrangements implementing such a re-order buffer would of course be possible. For instance, the processing in the first and second stages could be completely parallel, with the re-order buffer then being used to effectively combine the data generated from these parallel streams according to the desired sequence.

According to the second main approach, rather than simply writing out the data (commands) for each tile as a contiguous "chunk" of data with the data for each of the draw calls being written out in sequence to a shared data file (i.e. tile-list), as is in an embodiment the case in the first main approach, each of the draw calls is allocated an individual data file (memory location) into which the data (commands) for that draw call can be written. That is, rather than writing out the data for each of the draw calls for a given tile in sequence to a shared data file, the data for a given draw call is written out to its respective allocated data file (memory location). A "per draw call" data chunk is thus generated for each of the draw calls, and data can be written into a per draw call data chunks completely independently of the other data chunks. That is, the population of the individual data files (memory locations) for the draw calls can be performed entirely independently, and the draw calls can therefore be processed in any order.

At the same time, in order to guarantee the desired draw call ordering, a pointer list is generated including a list of pointers pointing to each of the respective per draw call data files (memory locations) associated with a given tile. According to the second main approach, the tile-list for a given tile thus contains a list of pointers that point to the individual data files associated with each of the draw calls to be rendered for that tile. The pointers are written into the pointer list in sequence in order to enforce the desired draw call ordering. A tile-list reader can thus work through the list of pointers in sequence, following each of the pointers to the respective data files (memory locations) for each of the draw calls, and extracting the data therefor.

Thus, in embodiments, the step of sorting the data generated for the plurality of draw calls based on the desired rendering order and generating for each tile a tile-list identifying which draw calls should be rendered, and in which order, for each tile comprises: allocating a respective data file for each draw call that is being processed, writing the data generated for each draw call to its respective data file, and generating for each tile an ordered list of pointers pointing to the data files for each of the draw calls that are to be rendered for that tile.

Because the draw call ordering is enforced using the pointer list, this opens up the possibility for the individual data files (i.e. the per draw call data chunks) to be generated in any order. So, although the second main approach could be implemented using a serial pipeline, if desired, the second main approach lends itself to parallelisation.

Thus, in embodiments of the second main approach, the draw calls are processed entirely in parallel. That is, vertex data is in an embodiment obtained and processed for a plurality of draw calls in parallel, and then written out in parallel to the respective data locations. The tiler pipeline is thus in an embodiment configured with a plurality of parallel first and second processing stages. A shared pointer management circuit in the third stage is then arranged to build the pointer list and enforce the desired draw call ordering. In this way the tiler pipeline can essentially be scaled to any desired performance, e.g. by adding more parallel tiling stages.

It will be appreciated that both of the first and second main approaches described herein allow the dependency between the processing of the draw calls to be broken, and thus allow for an improved tiler throughput, e.g. with reduced instances of stalling. So, in the technology described herein, the first stage only needs to enforce the ordering within individual draw calls whereas the desired ordering between draw calls is only enforced in the final stage prior to writing out the final tile-lists. Thus, the primitives may be processed out of order (e.g. in parallel) in the first and second stages of the tiler pipeline and then sorted when building the final tile-lists.

The tile-lists that are generated in this way are in an embodiment then written back to memory so that they can subsequently be fetched into a rendering pipeline of the graphics processor for rendering the scene (although other arrangements would of course be possible—for example, the tile-lists may be written out directly to local storage on the graphics processor for access by the rendering pipeline). The final (third) stage of the tiler pipeline thus includes a write out circuit for writing out these tile-lists.

Once the tile-lists have been generated and written out, the tile-lists can then be used, e.g. in the normal way, to generate the desired render output. For instance, once the primitives and their vertices have been defined, and the vertex data obtained, this vertex data can then be processed by a graphics processing system, in order, e.g. to display the desired render output. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively. These processes can use the tile-lists generated according to the technology described herein. Particularly, the system may read the tile-lists in order to determine which primitives need to be rendered for which tile (thus avoiding unnecessary processing for any primitives that do not appear in a particular tile).

So, the tile-lists generated according to the technology described herein may be passed into a graphics processing (rendering) pipeline, and used thereby in order to render a desired output. The graphics processing pipeline may contain any suitable and desired processing stages that a graphics processing pipeline may contain. In an embodiment, it includes, in an embodiment in this order, one or more of, and in an embodiment all of: the above mentioned rasteriser; an early depth (or an early depth and stencil) tester; a renderer, in an embodiment in the form of a fragment shader; a varyings position evaluation (interpolator) associated with the fragment shader; a late depth (or depth and stencil) tester; a blender; one or more tile buffers (in the case of tile-based rendering pipeline); and a tile write back unit (again in the case of a tile-based rendering pipeline).

Accordingly, the technology described herein also extends to graphics processing systems, and methods of graphics processing, that use the tile-lists prepared according to embodiments of the technology described herein.

A further embodiment comprises a method of graphics processing comprising preparing a set of tile-lists according to the methods of the technology described herein, and then using the tile-lists to render an output.

Yet another embodiment comprises a graphics processing system comprising a tiler pipeline for preparing a set of tile-lists substantially as described above according to any embodiments of the technology described herein, and a graphics processor that is configured to use the tile-lists when rendering an output. The graphics processor may suitably comprise a graphics processing (rendering) pipeline, e.g. as described above.

Although the above embodiment has been described with reference to using the tile-lists to indicate primitives to be rendered for the rendering process, it will be appreciated these lists could also or instead be used for other purposes, such as to perform (e.g. initial) culling, and/or hidden surface removal, of graphics data and descriptors.

The technology described herein may generally find application in any suitable tile-based rendering graphics processing system. In particular, the technology described herein may find utility for applications wherein the graphics processing is bound by the tiler performance, e.g. in situations where there are a relatively larger number of primitives to be processed.

The technology described herein can be used for all forms of output that a graphics processing pipeline may be used to generate, such as frames for display, render-to-texture outputs, etc.

In some embodiments, the tiler pipeline comprises, and/or is in communication with, one or more memories and/or memory devices that store the data described herein, such as the fragment data, other sample data, metadata etc., and/or store software for performing the processes described herein. The tiler pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The technology described herein relates to graphics processing systems that use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

The advantage of such tile-based rendering is that primitives that do not appear in a given tile do not have to be processed for that tile, and therefore can be ignored when the tile is processed. This can allow the overall amount of graphics processing necessary for a given scene to be reduced.

In a tile-based rendering system, it is accordingly usually desirable to be able to identify and know those primitives that are actually present in a given sub-region (tile), so as to, e.g., avoid unnecessarily rendering primitives that are not actually present in a tile. In order to facilitate this, it is known to prepare for each sub-region (tile) a list of the primitives to be rendered for that sub-region (e.g. that will appear in the sub-region). Such a "tile-list" (which can also be referred to as a "primitive list") identifies (e.g. by reference to a primitive indicator) the primitives to be rendered for the tile (sub-region) in question.

The process of preparing tile-lists for each sub-region (tile) to be rendered basically therefore involves determining the primitives that should be rendered for a given sub-region (tile). This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the tile-list for each tile that it falls within.) In effect, each sub-region (tile) can be considered to have a bin (the tile-list) into which any primitive that is found to fall within (i.e. intersect) the sub-region is placed (and, indeed, the process of sorting the primitives on a tile-by-tile basis in this manner is commonly referred to as "binning").

As known in the art, the process of determining the primitives that should be listed (rendered) for any given tile can be carried out at varying levels of precision, for example depending on efficiency optimisations for different parts of the tiling and rendering processes. For example, at the most precise level, it could be determined exactly which tiles a given primitive will appear at least in part in, and the primitive then included in the tile-lists for those tiles only. This is commonly referred to as "exact" binning.

FIG. 1 illustrates an exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the tile-list for each tile that it is found to fall within. Thus, taking the example shown in FIG. 1, the primitive 3 is added to the tile-list for tile 4, the primitive 5 is included in the tile-list for tiles 6 and 7, the primitive 8 is included in the tile-lists for tiles 9, 10, 11 and 12, and the primitive 13 is included in the tile-list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare tile-lists with a lower precision than is achieved with exact binning. This can be useful to, e.g., simplify the preparation of the tile-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the tile-lists.

Once lists of primitives to be rendered (tile-lists) have been prepared for each sub-region (tile) in this way, the (tile-)lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

Figure 2:
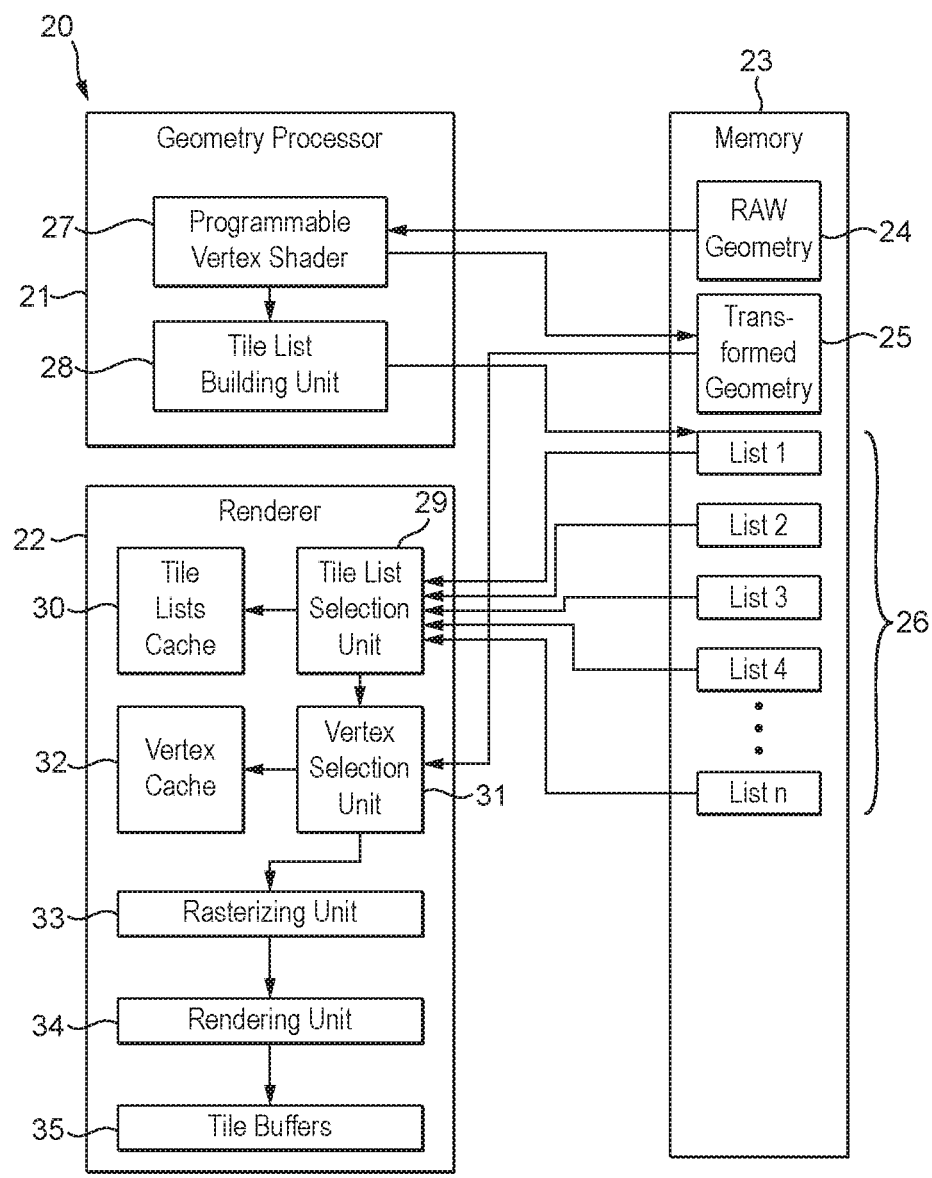
FIG. 2 shows schematically an arrangement of a graphics processor that can operate in accordance with the technology described herein.

FIG. 2 shows schematically a graphics processor 20 that may be operated in accordance with the technology described herein. The graphics processor 20 includes a geometry processor 21, and a renderer 22, both of which can access a memory 23. The memory 23 may be "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20), a set of transformed geometry data 25 (which is the result of various transformation and processing operations carried out on the raw geometry 24), and a set of tile-lists 26. The tile-lists 26 are prepared in accordance with the technology described herein. This process will be described in more detail below.

The transformed geometry data 25 comprises, for example, transformed vertices (vertex data), etc.

The geometry processor 21 comprises, inter alia, a programmable vertex shader 27, and a tile-list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for two-dimensional ('2D') placement in the frame to be displayed. The programmable vertex shader 27 and the processes it carries out can take any suitable form and be any suitable and desired such processes.

The tile-list building unit 28 carries out the process of the technology described herein of allocating the draw calls to the tile-lists which are then used by the renderer 22 to identify the draw calls that should be rendered for each sub-region of the scene to be rendered. To do this, the tile-list building unit 28 takes as its input the transformed and processed vertex data from the programmable vertex shader 27 (i.e. the positions of the graphics object in the scene), builds tile-lists using that data, and stores those lists as the tile-lists 26 in the memory 23.

The renderer 22 includes a tile-list selection unit 29, a tile-list cache 30, a vertex selection unit 31, a vertex data cache 32, a rasterising unit 33, a rendering unit 34, and tile buffers 35.

The rasterising unit 33, rendering unit 34, tile buffers 35 operate, in this embodiment, in the same manner as such units normally operate in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The tile-list selection unit 29 of the renderer 22 determines which draw call, and hence which primitive, is to be rendered next. It does this by considering the tile-lists 26 stored in the memory 23, and selecting from one of those lists the next graphics object (draw call) to be rendered.

The tile-list selection unit 29 can also place one or more tile-lists in the tile-list cache 30.

The tile-list selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

Figure 3:
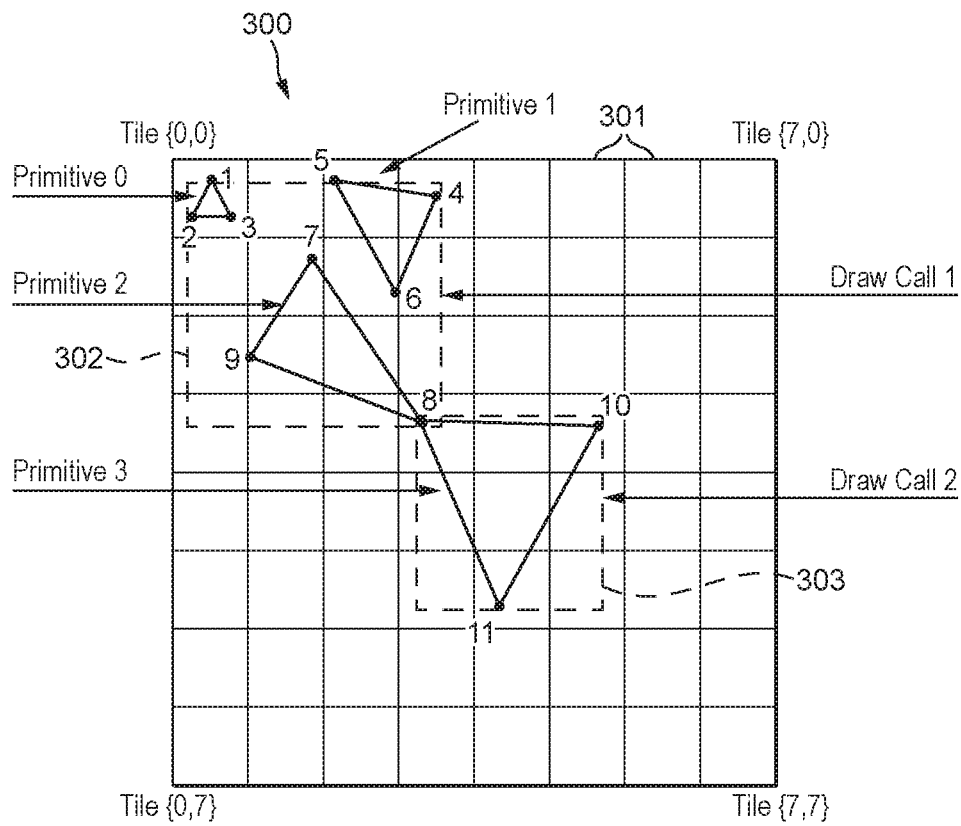
FIG. 3 shows an exemplary scene of primitives to be displayed.

FIG. 3 shows an exemplary scene to be displayed that will be used as the exemplary scene for display in the description of this embodiment of the technology described herein.

As can be seen from FIG. 3, the scene 300 contains four primitives, which are grouped into two "draw calls", draw call 1 and draw call 2. Primitives 0, 1 and 2 are grouped as draw call 1, and primitive 3 belongs to draw call 2. (Grouping primitives in "draw calls" basically means that the application programmer wants all the primitives in the draw call to be drawn in one go, typically for performance reasons. Primitive groups in the same draw call typically share the same state and shader programs data.)

It should also be noted here that in view of the fact that there are two separate draw calls, with primitive 2 in one and primitive 3 in the other, the vertex 8 shown in FIG. 3 cannot be shared between primitive 2 and primitive 3, but instead is represented as two different vertices, with the same vertex location and vertex attributes.

As shown in FIG. 3, the scene 300 to be rendered is divided into plural individual sub-regions or tiles 301.

(As will be appreciated by those skilled in the art, in practice any given scene to be rendered will typically comprise many more primitives and draw calls than the four primitives and two draw calls shown in FIG. 3. However, FIG. 3 shows four primitives and two draw calls only for simplicity and clarity purposes.)

In the present embodiment, the tile-list building unit 28 determines the location of each draw call, Draw Call 1 and Draw call 2, and lists the draw calls in a tile-list for each tile which the draw call falls within. In this way, the system can identify which draw calls should be rendered for each sub-region.

This could be done using, e.g., an exact binning technique, in which case the tile-list building unit 28 uses the determined transformed vertex positions it is provided with for a given draw call by the programmable vertex shader 27 to identify which sub-regions and sets of sub-regions the draw call falls within (intersects).

As will be appreciated by those skilled in the art, other techniques for determining and locating the draw calls within the scene and in relation to the sub-regions (tiles) 301 could be used if desired. For example, bounding box techniques could equally be used. FIG. 3 shows exemplary bounding boxes 302, 303 for the draw calls, Draw call 1 and Draw Call 2. (Where a bounding box technique is used, it is typical for the bounding box to be generated as part of the tile-list building process, e.g., by the tile-list building unit, but other arrangements would, of course, be possible.)

This process is repeated by the tile-list building unit 28 for each and every draw call in the scene to be rendered in turn, until complete tile-lists 26 (lists of draw calls) have been generated for each tile that the scene to be rendered is divided into.

The tile-list building unit 28 places the draw calls in the tile-lists 26 in the order that it receives the draw calls from the programmable vertex shader 27. This means that, so far as each individual tile-list 26 is concerned, the draw calls are listed according to the desired order of rendering the draw calls for that tile.

As discussed above, the renderer 22 also includes a tile-list cache 30 and a vertex data cache 32. These caches may comprise local memory provided on the renderer 22 that can be more rapidly accessed by processing units of the renderer (and in particular the tile-list selection unit 29 and vertex selection unit 31, respectively) than the main memory 23.

The tile-list selection unit 29 is configured to store in the tile-list cache 30 one or more tile-lists 26 that it has read from the main memory 23.

The vertex selection unit 31 can similarly cache vertex data that it retrieves from the transformed geometry data 25 in the memory 23 in the vertex data cache 32, again in particular where it can be identified that the vertex data will be required for a primitive again.

Figure 4:
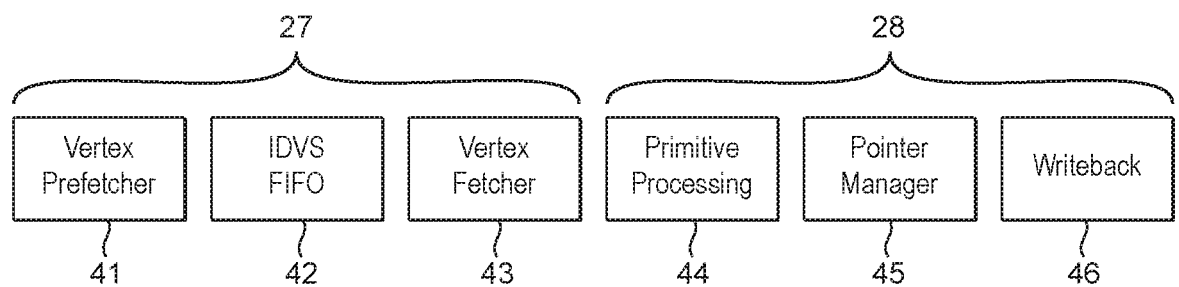
FIG. 4 shows in more detail an example of a tiling pipeline according to an example wherein the primitive ordering is enforced throughout the pipeline.

As described above, the draw calls should be listed in each individual tile-list 26 according to the desired draw call rendering order. One way to achieve this would be to simply process the primitives (and draw calls) in the order that they are generated, and enforcing strict serialisation of the primitives throughout the tiling pipeline. FIG. 4 shows in more detail an example of a tiling pipeline within the geometry processor 20 wherein such serialisation is enforced.

As shown in FIG. 4, the programmable vertex shader 27 can be broken down into a series of processing stage including a the vertex prefetcher 41, an index driver vertex shading first-in-first-out ('IDVS FIFO') buffer 42 that performs the required vertex shading operations and a vertex fetcher 43 for fetching the vertex data obtained by the IDVS FIFO 42. The vertex data is then passed to a primitive processing stage 44 of the tile-list building unit 28 where the tile-lists are built, e.g. by binning the primitives, as described above. A pointer manager 45 is provided for generating pointers identifying each of the tile-lists, and the tile-lists 26 are then written back to memory 23 by the write back stage 46.

In FIG. 4 the IDVS FIFO 42 works on the primitives strictly in order. This means that if the requested data for a given primitive being processed in not available, the IDVS FIFO 42 will stall pending the fetching of that data, even if there are other primitives further back in the queue that could in principle be processed.

The technology described herein thus provides a mechanism for relaxing some of the ordering requirements within the geometry processor 20, in order to improve the performance thereof, whilst still allowing the desired tile-lists 26 to be written out.

Figure 5:
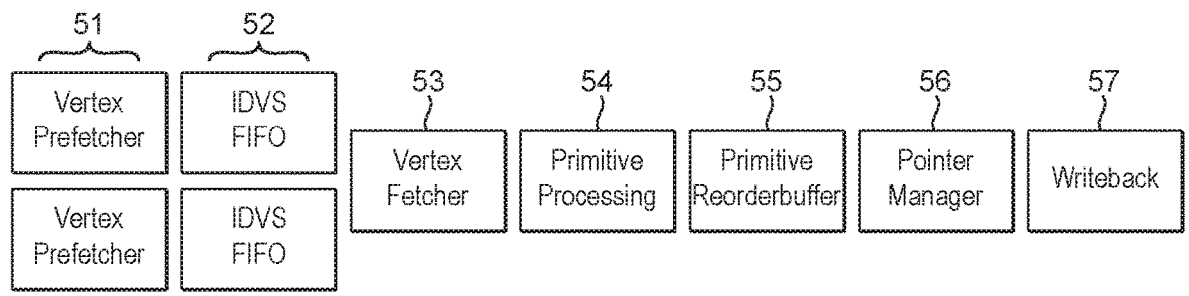
FIG. 5 shows an example of a tiler pipeline according to a first main embodiment of the technology described herein.

FIG. 5 shows a tiler pipeline according to a first main embodiment of the technology described herein wherein the draw calls can now be issued to the vertex fetcher 53 out of order. As shown in FIG. 5, the tiler pipeline now comprises parallel vertex prefetchers 51 and IDVS FIFOs 52. The tiler pipeline is thus able to obtain vertex data for a plurality of draw calls in parallel. As soon as the vertex data for a draw call is obtained, this can then be issued to the vertex fetcher 53, and processed in the primitive processing stage 54 in essentially the same manner as in FIG. 4. The vertex fetcher 53 is thus able to work across multiple draw call streams and fetch the vertex data for a draw call as soon as it is available, even if that draw call is not the next in the sequence.

In order to enforce the desired draw call ordering, a primitive re-order buffer 55 is thus included between the primitive processing 54 and pointer manager 56 stages. The draw call data can thus be written into the re-order buffer 55 in any order, but the buffer 55 is configured so that data is extracted strictly in order, thereby guaranteeing the desired ordering in the tile-lists. The ordered tile-lists extracted from the re-order buffer 55 can thus be passed to the write back stage 57 and written back to memory 23.

Figure 6:
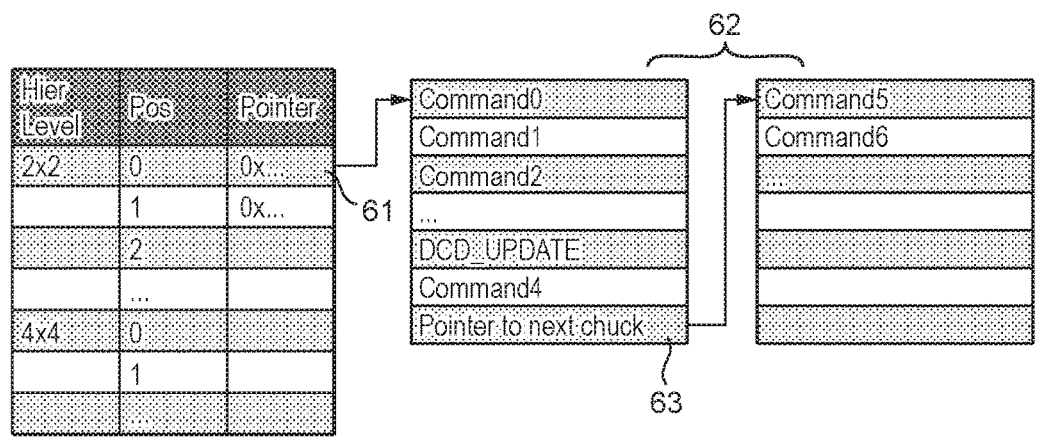
FIG. 6 shows an example of a tile-list that may be prepared according to the tiling pipelines shown in FIG. 4 or FIG. 5.

FIG. 6 shows an example of a tile-list that can be prepared using the tiling pipelines shown in either FIG. 4 or FIG. 5. For each tile, a pointer 61 is generated that points to its respective tile-list 62, the tile-list including an ordered set of commands relating to the draw calls for that tile. In both the arrangements shown in FIG. 4 and in FIG. 5, the draw call data is written into the list strictly in sequence, with the data (commands) for the first draw call in the sequence written first (e.g. "Command0", "Command1", "Command2", . . . ), and then (after the draw call update command 'DCD-UPDATE') the data for the second draw call ("Command4", etc.), and so on. Thus, as shown in FIG. 6, all of the draw calls for a given tile are written out contiguously to a shared data file (memory location). When the initial data file is full, a pointer 63 is added to another data location and the sequence of draw calls is continued. The tile-list reader can thus work through the tile-lists in order in order to identify which draw calls need to be rendered for which of the tiles.

Figure 8:
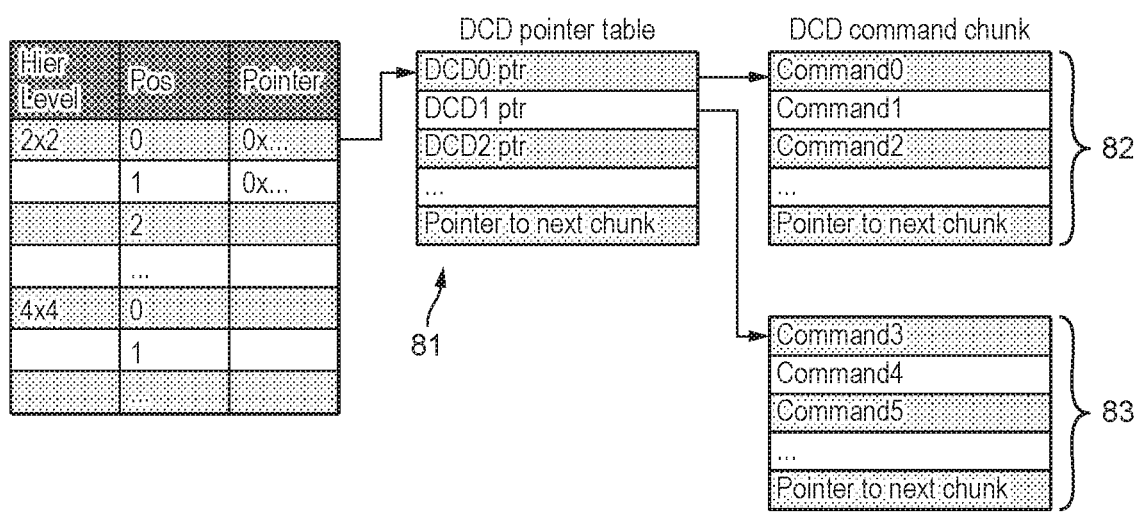
FIG. 8 shows an example of a tile-list that may be prepared according to the tiling pipeline shown in FIG. 7.

According to a second main embodiment of the technology described herein, rather than writing out all of the draw calls for a given tile to a shared data file, as shown in FIG. 6, each of the draw calls is allocated its own data file (memory location). So, for each draw call, an independent command "chunk" 82, 83 can be generated, as shown in FIG. 8, and these command chunks 82, 83 can be populated entirely independently of one another. At the same time, a list of pointers (the DCD pointer table 81) is generated including in sequence pointers pointing to each of the respective command chunks 82, 83. The desired draw call ordering is thus enforced by the pointer table 81. The tile-lists 26 now comprise the pointer table 81, which the tile-list reader (tile-list selection unit 29) can work through in order to identify which draw calls are to be rendered for each tile.

Advantageously, because the command chunks 82, 83 can be generated completely independently, this opens up the possibility for greater parallelisation of the tiler pipeline, and hence allows the tiler performance to be scaled to any desired level (e.g. by adding additional parallel stages to the tiler pipeline).

Figure 7:
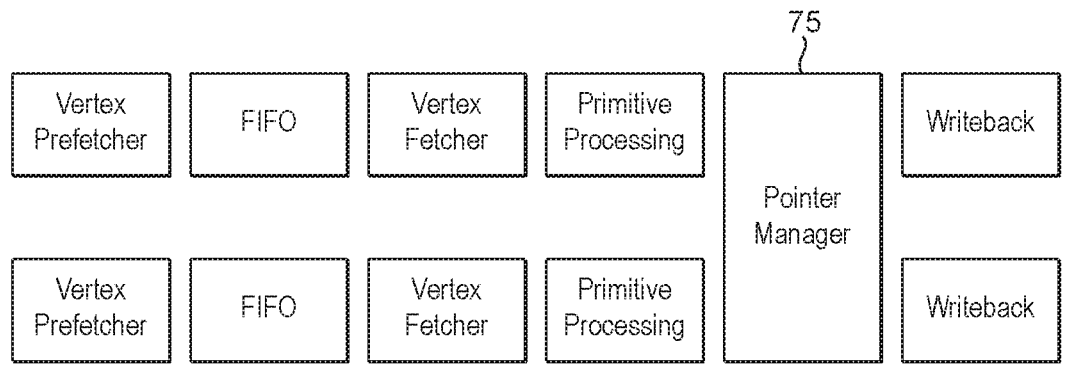
FIG. 7 shows an example of a tiler pipeline according to a second main embodiment of the technology described herein.

FIG. 7 shows a tiling pipeline according to a second main embodiment wherein primitives for a plurality of draws can be processed completely in parallel. However, as shown in FIG. 7, a shared pointer manager unit 75 is included before the write back stage that is able to generate a suitable pointer table 81 for the tile-list in order to enforce the desired draw call ordering.

As will be appreciated by those skilled in the art, the present embodiment (and the technology described herein) can be implemented in any tile-based rendering system, as desired. The various components and functions of the present embodiment and the technology described herein can similarly be implemented as desired and using any suitable techniques.

The invention claimed is:

1. A method for determining a set of tile-lists for use in a tile-based graphics processing system, the tile-lists indicating which primitives are to be rendered for each of the tiles in a scene to be rendered when rendering the scene for display, the method comprising:
    executing a tiler pipeline that comprises:
    obtaining vertex data for a plurality of draw calls, wherein the plurality of draw calls are to be rendered in a desired rendering order such that there is an ordering dependency between the draw calls in the plurality of draw calls, and wherein each draw call is associated with a set of one or more primitives; and
    processing each of the plurality of draw calls using the obtained vertex data to generate, for each of the draw calls, data indicative of which tile(s) the primitives associated with that draw call should be rendered for when rendering the scene for display,
    wherein, when performing the processing of the plurality of draw calls using the obtained vertex data to generate, for each of the draw calls, data indicative of which tile(s) the primitives associated with that draw call should be rendered for when rendering the scene for display, at least some of the draw calls in the plurality of draw calls are processed out of the desired rendering order, such that the ordering dependency between the draw calls in the plurality of draw calls is not enforced at this stage in the tiler pipeline, whereby at least some of the data generated for the draw calls in the plurality of draw calls is generated in a different order to the desired rendering order for the plurality of draw calls;
    the method further comprising:
    sorting the data generated for the plurality of draw calls based on the desired rendering order and generating,. for each tile, a tile-list identifying which draw calls should be rendered, and in which order, for that tile by allocating a respective memory location for each draw call that is being processed, writing the data generated for each draw call to its respective memory location, and generating for each tile an ordered list of pointers pointing to the respective, allocated memory locations for each of the draw calls that are to be rendered for that tile, the ordered list of pointers thereby enforcing the desired rendering order between the plurality of draw calls such that any draw calls in the plurality of draw calls that were processed out of the desired rendering order for the plurality of draw calls are identified in the tile-lists in the desired rendering order; and
    writing out the tile-lists for each of the tiles so that the tile-lists can be used to identify which primitives are to be rendered for each of the tiles in a scene to be rendered when subsequently rendering the scene for display.

2. The method of claim 1, wherein the step of sorting the data generated for the plurality of draw calls based on the desired rendering order and generating for each tile a tile-list including a set of data identifying which draw calls should be rendered, and in which order, for each tile comprises: passing the data generated for each of the draw calls into a buffer, and writing out the data for the tile-list for a tile from the buffer in sequence according to the desired rendering order.

3. The method of claim 2, wherein the step of processing the plurality of draw calls using the obtained vertex data comprises processing the plurality of draw calls in a serial pipelined fashion.

4. The method of claim 2, wherein data identifying which draw calls should be rendered, and in which order, for a given tile is written out contiguously from the buffer into a shared data file associated with that tile.

5. The method of claim 1, wherein obtaining the vertex data for the plurality of draw calls comprises prefetching raw geometry data for each of the draw calls and processing the raw geometry data to obtain the vertex data for each draw call.

6. The method of claim 5, wherein the raw geometry data for a plurality of draw calls is processed in parallel, and wherein the obtained vertex data for at least some of the plurality of draw calls is then issued into a serial pipeline in an order other than the desired rendering order, and subsequently processed to generate the data indicative of which tile(s) that draw call is associated with, wherein the step of processing the plurality of draw calls using the obtained vertex data comprises processing the plurality of draw calls in a serial pipelined fashion.

7. The method of claim 1, wherein obtaining the vertex data for the plurality of draw calls comprises prefetching raw geometry data for each of the draw calls and processing the raw geometry data to obtain the vertex data for each draw call.

8. The method of claim 1, wherein the vertex data is obtained and processed to generate the data indicative of which tile(s) the draw calls are associated with, for a plurality of draw calls in parallel.

9. A method of graphics processing, comprising preparing a set of tile-lists according to a method as claimed in claim 1, and using the tile-lists to render an output.

10. The method of claim 1, wherein the processing of the plurality of draw calls using the obtained vertex data to generate, for each of the draw calls, data indicative of which tile(s) the primitives associated with that draw call should be rendered for when rendering the scene for display includes:
processing a first subset of draw calls in the plurality of draw calls out of the desired rendering order, such that the ordering dependency between the draw calls in the first subset of draw calls is broken; and
processing a second, different subset of draw calls in the plurality of draw calls in the desired rendering order.

11. A tiler pipeline for determining a set of tile-lists for use in a tile-based graphics processing system, the tile-lists indicating which primitives are to be rendered for each of the tiles in a scene to be rendered when rendering the scene for display, the tiler pipeline comprising:
a first stage including a vertex data fetching circuit for obtaining vertex data for a plurality of draw calls to be processed, each draw call being associated with a set of one or more primitives;
a second stage including a primitive processing circuit for processing the plurality of draw calls using the respective vertex data obtained from the first stage to generate, for each draw call, data indicative of which tile(s) the primitives associated with that draw call should be rendered for when rendering the scene for display; and
a third stage including a write-out circuit for writing out a set of tile-lists indicating which draw calls should be rendered, and in which order, for each of the tiles so that the tile-lists can be used to identify which primitives are to be rendered for each of the tiles in a scene to be rendered when subsequently rendering the scene for display;
wherein the tiler pipeline is operable to handle the plurality of draw calls, wherein the plurality of draw calls are to be rendered in a desired rendering order such that there is an ordering dependency between the draw calls in the plurality of draw calls, and wherein, when handling the plurality of draw calls, the first and second stages are configured to process the vertex data for at least some of the draw calls in the plurality of draw calls out of order, such that the ordering dependency between the draw calls in the plurality of draw calls is not enforced at the second stage in the tiler pipeline, whereby at least some of the data generated for the draw calls in the plurality of draw calls is generated in a different order to the desired rendering order for the plurality of draw calls,
wherein the tiler pipeline further comprises a tile-list generating circuit configured to sort the data generated for the plurality of draw calls based on the desired rendering order and to generate for each tile a tile-list identifying which draw calls should be rendered, and in which order, for that tile, so that the tile-lists can be used to identify which primitives are to be rendered for each of the tiles in a scene to be rendered when subsequently rendering the scene for display;
wherein the tile-list generating circuit is configured to allocate a respective memory location for each draw call that is being processed, so that the data generated for each draw call is written to its respective memory location, and to generate for each tile an ordered list of pointers pointing to the respective, allocated memory locations for each of the draw calls that are to be rendered for that tile, the ordered list of pointers thereby enforcing the desired rendering order between the plurality of draw calls such that any draw calls in the plurality of draw calls that were processed out of the desired rendering order for the plurality of draw calls are identified in the tile-lists in the desired rendering order.

12. The tiler pipeline of claim 11, wherein the tile-list generating circuit comprises a buffer, and wherein the data generated for each of the draw calls is passed into the buffer in the order that it is generated, and then the data for each tile-list is written out from the buffer in sequence according to the desired rendering order.

13. The tiler pipeline of claim 11, wherein the first stage further comprises a prefetching circuit for prefetching raw geometry data for each of the draw calls and a primitive assembly circuit for processing the raw geometry data to obtain the vertex data for each draw call.

14. The tiler pipeline of claim 13, wherein the first stage comprises parallel prefetching and primitive assembly circuits, and wherein raw geometry data for a plurality of draw calls is processed in parallel, and the obtained vertex data for at least some of the plurality of draw calls is then fetched and issued to the second stage for processing out of order, and wherein the primitive processing circuit of the second stage is configured to process the plurality of draw calls in a serial pipelined fashion.

15. The tiler pipeline of claim 11, wherein the primitive processing circuit of the second stage is configured to process the plurality of draw calls in a serial pipelined fashion.

16. The tiler pipeline of claim 11, wherein data identifying which draw calls should be rendered, and in which order, for a given tile is written out contiguously from the buffer into a shared data file associated with that tile.

17. The tiler pipeline of claim 11, wherein the first stage further comprises prefetching circuit for prefetching raw geometry data for each of the draw calls and primitive assembly circuit for processing the raw geometry data to obtain the vertex data for each draw call.

18. The tiler pipeline of claim 11, comprising a plurality of parallel first and second stages that are configured to obtain and process vertex data for a plurality of draw calls in parallel.

19. A graphics processing system comprising a tiler pipeline according to claim 11 for preparing a set of tile-lists, and a graphics processor that is configured to use the tile-lists when rendering an output.

20. A method for determining a set of tile-lists for use in a tile-based graphics processing system, the tile-lists indicating which primitives are to be rendered for each of the tiles in a scene to be rendered when rendering the scene for display, the method comprising:
    executing a tiler pipeline that comprises:
    obtaining vertex data for a plurality of draw calls, wherein the plurality of draw calls are desired to be rendered in a desired rendering order such that there is an ordering dependency between the draw calls in the plurality of draw calls, and wherein each draw call is associated with a set of one or more primitives; and
    processing each of the plurality of draw calls using the obtained vertex data to generate, for each of the draw calls, data indicative of which tile(s) the primitives associated with that draw call should be rendered for when rendering the scene for display,
    wherein, when performing the processing of the plurality of draw calls using the obtained vertex data to generate, for each of the draw calls, data indicative of which tile(s) the primitives associated with that draw call should be rendered for when rendering the scene for display, at least some of the draw calls in the plurality of draw calls are processed out of the desired rendering order, such that the ordering dependency between the draw calls in the plurality of draw calls is not enforced at this stage in the tiler pipeline, whereby at least some of the data generated for the draw calls in the plurality of draw calls is generated in a different order to the desired rendering order for the plurality of draw calls;
    the method further comprising:
    sorting the data generated for the plurality of draw calls based on the desired rendering order and generating, for each tile, a tile-list identifying which draw calls should be rendered, and in which order, for that tile by passing the data generated for each of the draw calls into a buffer in the order in which the different draw calls were processed, and enforcing the desired rendering order by writing out the data for the tile-list for a tile from the buffer in sequence according to the desired rendering order such that any draw calls in the plurality of draw calls that were processed out of the desired rendering order for the plurality of draw calls are identified in the tile-lists in the desired rendering order; and
    writing out the tile-lists for each of the tiles so that the tile-lists can be used to identify which primitives are to be rendered for each of the tiles in a scene to be rendered when subsequently rendering the scene for display.

21. The method of claim 20, wherein obtaining the vertex data for the plurality of draw calls comprises prefetching raw geometry data for each of the draw calls and processing the raw geometry data to obtain the vertex data for each draw call, wherein the raw geometry data for a plurality of draw calls is processed in parallel, and wherein the obtained vertex data for at least some of the plurality of draw calls is then issued into a serial pipeline in an order other than the desired rendering order, and subsequently processed to generate the data indicative of which tile(s) that draw call is associated with; wherein the step of processing the plurality of draw calls using the obtained vertex data comprises processing the plurality of draw calls in a serial pipelined fashion.

* * * * *

UNITED STATES PATENT AND TRADEMARK OFFICE
CERTIFICATE OF CORRECTION

| | |
|---|---|
| PATENT NO. | : 11,361,485 B2 |
| APPLICATION NO. | : 16/658926 |
| DATED | : June 14, 2022 |
| INVENTOR(S) | : Uhrenholt |

It is certified that error appears in the above-identified patent and that said Letters Patent is hereby corrected as shown below:

In the Claims

Column 20, Lines 35-36 (Claim 1, Lines 33-34) please replace "generating,. for" with --generating, for--

Column 24, Lines 5-6 (Claim 20, Lines 33-34) please replace "generating,. for each tile,." with --generating, for each tile,--

Signed and Sealed this
Fourth Day of April, 2023

Katherine Kelly Vidal
*Director of the United States Patent and Trademark Office*